United States Patent [19]

Wiesenberger et al.

[11] Patent Number: 4,486,413

[45] Date of Patent: Dec. 4, 1984

[54] PROTEIN CONTAINING CONDITIONING DRINK

[75] Inventors: Alfred Wiesenberger, Wiesbaden-Sonnenberg; Erich Kolb, Nieder-Olm; Iris Engelhardt, Hochheim, all of Fed. Rep. of Germany

[73] Assignee: Firma Peter Eckes, Nieder-Olm, Fed. Rep. of Germany

[21] Appl. No.: 416,761

[22] Filed: Sep. 10, 1982

[30] Foreign Application Priority Data

Sep. 21, 1981 [DE] Fed. Rep. of Germany ....... 3137440

[51] Int. Cl.$^3$ .................. A61K 37/00; A23L 2/00; A23L 1/30; A23C 17/00; A23J 1/00; A23K 1/175

[52] U.S. Cl. .................. 424/177; 426/599; 426/590; 426/72; 426/73; 426/583; 426/656; 426/74

[58] Field of Search .................. 426/599, 590, 74, 72, 426/73, 583, 656; 424/177

[56] References Cited

U.S. PATENT DOCUMENTS

| | | |
|---|---|---|
| 1,759,706 | 5/1930 | Nielsen .................. 426/599 |
| 2,919,195 | 12/1959 | Block .................. 426/599 |
| 3,897,570 | 7/1975 | Yokotsuka et al. .................. 426/599 |
| 3,917,852 | 11/1975 | Maraulja et al. .................. 436/599 |
| 3,930,039 | 12/1975 | Kuipers .................. 426/583 |
| 3,949,098 | 4/1976 | Bangert .................. 426/583 |
| 4,061,792 | 12/1977 | Inagami et al. .................. 426/599 |
| 4,078,092 | 3/1978 | Nishiyama .................. 426/599 |
| 4,107,334 | 8/1978 | Jolly .................. 426/583 |
| 4,200,662 | 4/1980 | Scibelli .................. 426/583 |
| 4,358,464 | 11/1982 | Soehnlen .................. 426/583 |

*Primary Examiner*—Delbert R. Phillips
*Attorney, Agent, or Firm*—Felfe & Lynch

[57] ABSTRACT

Protein-containing conditioning drink on the basis of a mineral- and vitamin-enriched fruit juice beverage, which consists of a content of 30 to 90 wt. % of a fruit juice or of a mixture of different fruit juices corresponding to a content of 4 to 20 wt. % of solids, a content of 2 to 20 wt. % of a liquid whey concentrate corresponding to a whey protein content of 1.2 to 5 wt. %, whose lactose content is enzymatically cleaved, and/or of partially hydrolyzed soya protein, as well as a natural flavor adjustment flavoring, plus mineral salts and added vitamins, and has a pH between 4.0 and 5.0, preferably of pH 4.2 to 4.4.

12 Claims, No Drawings

PROTEIN CONTAINING CONDITIONING DRINK

The present invention relates to a protein-containing conditioning drink on the basis of a mineral- and vitamin-enriched beverage with a high fruit-juice content. The term, "conditioning drink," as used herein, is to be understood to refer to a beverage which regulates the physical capabilities of the body and is equally suitable for amateur and professional athletes. For this purpose a great number of different beverages are already in use, some of which are directly mixed by the trainers or by the athletes themselves.

For example, aqueous salt solutions are in wide use at athletic fields for the purpose of compensating the salt loss that is observed to accompany protracted physical exertion, especially at high atmospheric temperatures. Sometimes, soluble vitamins are added to such drinks, or other substances such as dextrose. To improve their flavor, fruit juices are occasionally mixed with such drinks, making them more similar to conventional soft drinks based on fruit juices.

For nutritional reasons, it would be desirable if proteins could also be added to such a beverage without causing the beverage to lose its "soft-drink" character.

A number of experiments have been made in the past in enriching beverages with proteins. To the extent that they are in the nature of milk drinks there have been no problems in this regard. But in the case of soft drinks based on vegetables or especially fruit juice, the incorporation of proteins involves difficulties since such drinks have a pH in the acid range, with the result that the proteins of many protein additives used in the food industry do not remain in solution but are precipitated. Heretofore, however, it has not been possible to find any of such proteins which could be incorporated into a conditioning drink because either the taste of the protein additive was incompatible with the soft-drink character that was also sought, or the proteins proved to be insufficiently stable under the heating required in the production of the beverage.

Only in the case of an aqueous beverage on the basis of tomatoes with a pH between 4.0 and 4.5 was a protein composition found which corresponded in taste to the special character of such a beverage and provided a sufficiently stable solution (cf. DE-OS No. 2,505,717). This protein composition was a mixture of certain meat proteins with a partially hydrolyzed soybean protein. The fact that such a protein composition could be used in attributed in part to the special solution-stabilizing effect of the tomatoes.

For incorporation into beverages on a fruit juice basis, these proteins proved to be unsuitable, as did approximately 80 other proteins tested, such as for example a number of soya proteins, milk proteins, meat proteins, blood albumin, hen's egg albumin, potato protein, algae proteins, cottonseed protein, fish protein, and KK proteins.

BRIEF DESCRIPTION OF THE INVENTION

It is the object of the invention to create a protein-enriched conditioning drink which will be similar in taste to common beverages on a fruit-juice basis, and thus will qualify for adoption even by amateur athletes as a daily beverage, and that can be stabilized by pasteurization like common fruit juices and nectars and produced on a large scale. It is to be characterized, furthermore, by sufficient stability as well as by good tolerability, which is an essential requirement for the prevention of any loss of the body's capabilities.

This object is achieved in accordance with the invention by a protein-containing conditioning drink on the basis of a mineral- and vitamin-enriched beverage containing fruit juice, which is characterized by consisting of a content of 30 to 90% of a fruit juice or of a mixture of different fruit juices, corresponding to a solids content of 4 to 20%, a content of 2 to 20% of a whey concentrate corresponding to a whey protein content of 1.2 to 5%, in which the lactose content has been cleaved enzymatically, and/or of partially hydrolyzed soya protein, as well as a natural adjustment flavoring, mineral salts and additional water if needed, and an addition of vitamins, such a beverage having a pH between 4.0 and 5.0, all percentages being percentages by weight.

It was surprising to find in the research that commercially obtainable whey concentrates are suitable for the creation of a conditioning drink with the desired properties of a soft drink of high fruit-juice content, if the common amounts of lactose present in these whey concentrates are largely broken down by enzyme action to their components, lactose, glucose and galactose, prior to the preparation of the beverage. It could not have been expected that such whey concentrates, whose protein content usually ranges from 9 to 30% by weight, would be suitable for the conditioning beverage of the invention. For it was known that the whey proteins present in the form of a solution at room temperature have an isoelectric point of approximately 4.6, and that when heated at this pH they coagulate. Since drinks containing fruit juices very often have a pH between 4.0 and 5.0, the ideal environment for the precipitation of the whey proteins on heating, it was to be expected that, when the final pasteurization and heating that is necessary in the bottling of the beverages is performed, the added proteins would precipitate at least partially. Surprisingly, however, this was not the case if the lactose content of the whey concentrates had previously been broken down by enzyme action, and if furthermore a mixture with fruit juices in the amounts given above had been selected. It appears to be that, on the one hand the special protein selected behaves differently from what was to be expected, and that possibly also the proportions used in the composition of the entire drink, i.e., the fruit-juice content, and in some cases also the mineral salt content, has a stabilizing action.

It was furthermore found that the special protein used in combination with the simple sugars produced by the enzymatic action does not spoil the fruit juice flavor of the drink or alter it in any way, so that the conditioning drink is very tasty. The drink has furthermore proven to have good keeping qualities without the flavor degradation so often to be observed, and it was also very well tolerated. A conditioning drink that is especially desirable from every point of view is obtained when the whey protein content is between 1.5 and 3.5 percent by weight. Sweet whey concentrate is the preferred whey concentrate. It is furthermore advantageous to assure that, in the enzymatic cleavage of the lactose, the residual content of uncleaved lactose is at levels between 3.5 and 7%. The preferably liquid whey concentrate can be replaced partially or entirely by partially hydrolyzed soya protein, especially if a reduction of the sugar content is desired.

An especially advantageous conditioning drink furthermore contains as fruit juice component a mixture of the following fruit juices in the amounts stated in percent by weight:

apple juice—20 to 70 wt.-%
passionfruit juice—1 to 10 wt.-%
grape juice (white)—4 to 40 wt.-% and
lemon juice—5 to 25 wt.-%.

Especially preferred ranges of the percentages of the above-named fruit juice components are between 25 and 40 weight-percent for apple juice, between 3 and 5% for passionfruit juice, between 10 and 20% for grape juice (white) and also between 10 and 20% for lemon juice, by weight. In the especially advantageous conditioning drinks specified, the pH is about 4.3. In addition to a natural adjustment flavoring of 1 to 10%, preferably 3 to 5%, and additional water in an amount from 0 to 70 wt.-%, preferably 10 to 30%, the conditioning drink of the invention also contains mineral salts and added vitamins. The mineral salt mixture is a mixture of physiologically important salts which are advantageously present in the drink in the following amounts:

$K^+$—0.028 to 0.28%, preferably 0.12–0.15%
$Na^+$—0.028 to 0.28%, preferably 0.12–0.15%
$Mg^{2+}$—0.002 to 0.08%, preferably 0.008–0.015%
$Ca^{2+}$—0.01 to 0.3%, preferably 0.02–0.03%
and, as anion:
$PO_4^{3-}$—0.006 to 0.5%, preferably 0.08–0.1%.

In all cases, the percentages given are percentages by weight for each part by volume of the complete conditioning drink of the invention. One liter of the conditioning drink can be equated, with sufficient accuracy, to approximately 1050 to 1100 grams.

Vitamins are also added to the conditioning drink. The addition of vitamins to foods is governed by law. Preferably several or all of the allowed vitamins are added to the conditioning drink of the invention, in amounts corresponding to the daily requirement recommended by the DGE, a certain excess that can be established experimentally being selected, which is necessary in order to compensate the stability of the vitamins, which is not adequate in all cases, such that the prepared drink will contain in 0.2 liters the recommended minimum daily requirement of approved vitamins even after relatively long storage. As it appears from a consideration of all of the above, a conditioning drink in accordance with the invention, in its preferred form, will have a composition such as that set forth in Table 1.

TABLE 1

|  | Range | Preferred |
|---|---|---|
| Apple juice | 20–70% | 50–65% |
| Passionfruit juice | 1–10% | 3–5% |
| Grape juice (white) | 4–40% | 10–20% |
| Lemon juice | 5–25% | 10–20% |
| Whey protein, liquid concentrate, in which the lactose is broken down | 2–20% | 11–17% |
| Natural balancing flavors | 1–10% | 3–5% |
| Water | 0–70% | 0–30% |
| $K^+$ | 0.028–0.28% | 0.12–0.15% |
| $Na^+$ | 0.028–0.28% | 0.12–0.15% |
| $Mg^{2+}$ | 0.002–0.08% | 0.008–0.015% |
| $Ca^{2+}$ | 0.01–0.3% | 0.02–0.03% |
| P | 0.006–0.5% | 0.08–0.1% |
| pH | 4.2–4.4 | 4.3% |

In addition to the specified components, vitamins are used in accordance with food law requirements.

The preparation of the conditioning drink of the invention is performed by producing a mixture of the whey hydrolyzate with apple juice as well as the passionfruit juice and the grape juice, and preparing separately therefrom a second mixture, which is a mixture of water and lemon juice to which the mineral salts, i.e., the sodium salt, the magnesium salt, the calcium salt and the potassium salt, are added in a certain sequence, and to which the vitamin mixture is also added. This second mixture is added, with stirring, to the fruit juice mixture containing the whey hydrolyzate. Then the flavor balancing agents are added. After the mixing is completed, the mixture is pasteurized, bottled hot, and after a holding period is cooled. The time elapsing between the mixing and the bottling is not to exceed 4 hours. If water is added, desalted water is used preferentially.

BRIEF DESCRIPTION OF A PREFERRED EMBODIMENT

The detailed procedure for the preparation of the conditioning drink of the invention will be set forth in the following example, in which the production of an especially preferred conditioning drink pursuant to the invention is explained.

For the preparation of one liter of a conditioning drink in accordance with the present invention, the procedure is as follows:

150 milliliters of a liquid whey concentrate containing approximately 12%, by weight, of sweet whey protein, are prepared in a known manner by enzymatic hydrolysis with one of the enzymes suitable for the cleavage of disaccharides—lactase, for example—to break down the lactose to the simple sugars, glucose and galactose, until the residual lactose content amounts to 3.5 to 7%. The whey concentrate is then dissolved in 300 ml of apple juice while stirring with a jet mixer, for example, such that no residue nor any sediment remains. Then 30 ml of passionfruit juice is added with constant stirring, and then, while stirring continues, another 150 ml of white grape juice is added. During the entire mixing procedure for the preparation of the above solution, the temperature of the liquid is controlled so as not to exceed a maximum of 15° C.

Parallel to the preparation of the first solution, a second solution is prepared by adding to 180 ml of water enough lemon juice to bring the pH to a level of 2.5 to 2.7 (approximately 150 ml). Then the mineral salts, ground dust-fine, are added very slowly and gradually in small amounts, with constant stirring to forestall irreversible clumping. The mixture consists of sodium salt containing 1.4 g of $Na^+$ ions, magnesium salt containing 0.1 g of $Mg^{2+}$ ions, calcium salt with a content of 0.26 g of $Ca^{2+}$ ions, and potassium salt with a content of 1.4 g of $K^+$ ions. The salts are selected such that 0.9 g of phosphate is introduced simultaneously into the solution. When all the salts are completely dissolved, and a uniform solution is obtained, the solution is cooled to a temperature of at least 20° C. Then a mixture of all of the vitamins approved for vitamin-enriched foods are added to the second solution. The mineral and vitamin mixture prepared separately as just described, in water and lemon juice, is added with stirring to the first solution, that is, to the fruit juice mixture. After the two solutions are uniformly mixed, a flavor adjustment is performed whereby approximately 50 g of plant extracts are put into the mixture. At the same time care must be taken that the temperature of the mixture never exceeds a maximum of 15° C.

The finished mixture is pasteurized at temperatures between 75° and 90° C., and then bottled at a temperature of 83° to 87° C., and, after a holding time of 5 to 20 minutes, it is re-cooled.

The product has a pH of 4.3 and contains the individual components in the following amounts:

| | |
|---|---|
| Apple juice | 30% |
| Passionfruit juice | 3% |
| Grape juice (white) | 15% |
| Lemon juice | 15% |
| Liquid whey concentrate (whey protein content 2%) | 15% |
| Natural flavor balancing agents | 5% |
| Desalted water | 18% |
| Mineral salts: $K^+$ | 0.14% |
| $Na^+$ | 0.14% |
| $Mg^{2+}$ | 0.01% |
| $Ca^{2+}$ | 0.026% |
| P | 0.09% |

Vitamins per liter: five times the minimum daily requirement, plus any excess required for reasons of stability.

The product obtained is a non-clouding liquid with very pleasant sensory properties, i.e., with a pleasant, fruity flavor and, despite the relatively high solids content, a pleasing consistency, making it a tasty beverage having the character of a refreshment soft drink.

It will be understood that the specification and examples are illustrative but not limitative of the present invention and that other embodiments within the spirit and scope of the invention will suggest themselves to those skilled in the art.

What is claimed is:

1. Protein-containing conditioning drink consisting essentially of 30 to 90 wt.% of a fruit juice or of a mixture of fruit juices having a solids content of 4 to 20 wt.%; 2 to 20 wt.% of a whey concentrate corresponding to a whey protein content of 1.2 to 5 wt.% and whose lactose content is enzymatically cleaved; mineral salts and vitamins; and having a pH of 4.0 to 5.0.

2. Protein-containing conditioning drink as claimed in claim 1, containing said whey concentrate.

3. Protein-containing conditioning drink as claimed in claim 1, further containing natural adjustment flavoring.

4. Protein-containing conditioning drink as claimed in claim 1, containing additional water.

5. Protein-containing conditioning drink as claimed in claim 1, containing both additional mineral salts and added vitamins.

6. Protein-containing conditioning drink as claimed in claim 1, having a content of sweet whey concentrate corresponding to a whey protein content of 1.2 to 3.5 wt.-%.

7. Protein-containing conditioning drink as claimed in claim 1, wherein the lactose is cleaved enzymatically into glucose and galactose until its residual content is 3.5 to 7%.

8. Protein-containing conditioning drink as claimed in claim 1, containing a mixture of the following fruit juices in the stated amounts:
Apple juice—20 to 70 wt.-%,
Passionfruit juice—1 to 10 wt.-%,
Grape juice (white)—4 to 40 wt.-%,
Lemon juice—5 to 25 wt.-%.

9. Protein-containing conditioning drink as claimed in claim 1, wherein it has a pH of 4.2 to 4.4.

10. Protein-containing conditioning drink as claimed in claim 1, containing a mixture of mineral salts in the following amounts:
$K^+$—0.028 to 0.28 wt.-%,
$Na^+$—0.028 to 0.28 wt.-%,
$Mg^{2+}$—0.002 to 0.08 wt.-%,
$Ca^{2+}$—0.01 to 0.3 wt.-%,
$PO_4^{3-}$—0.006 to 0.5 wt.-%.

11. Protein-containing conditioning drink as claimed in claim 1, containing, in 0.2 l of liquid, no more than the recommended daily requirement of vitamins plus an excess to compensate for the limited stability of the vitamins used.

12. Protein-containing conditioning drink as claimed in claim 1, wherein said pH is 4.2 to 4.4.

* * * * *